Patented Aug. 28, 1945

2,383,633

UNITED STATES PATENT OFFICE 2,383,633

PROCESS FOR TREATING FATTY GLYCERIDES

Walter Russell Trent, North Arlington, N. J., assignor to Colgate-Palmolive-Peet Company, Jersey City, N. J., a corporation of Delaware No Drawing. Application January 30, 1943, Serial No. 474,188

12 Claims. (Cl. 260—410.9)

The present invention relates to a process for treating fatty materials and, more particularly, to an improved process for producing fatty acid esters and glycerine in respective layers adapted for being sharply separated by settling.

In the prior art, it has been taught that alkyl esters of fatty acids can be prepared by reacting a fat or fatty oil with an alcohol in the presence of a small amount of an alcoholysis catalyst to produce esters of the fatty acid and glycerine, and separating the esters from the glycerine. Although alcoholysis with methanol provided a reaction mixture which could be settled and from which a lower glycerine layer could be withdrawn, the glycerine contained dissolved methyl alcohol which in turn kept some of the methyl esters in solution in the lower layer. Moreover, the upper layer contained some dissolved glycerine along with the methyl esters and alcohol. This required separate working up of the two layers. When ethyl or higher alcohols were used for the alcoholysis, separation of the glycerine was not immediately obtainable, and the prior art taught to wash out alcohol and catalyst with water to effect the separation. Furthermore, the recovered unreacted alcohol had to be dehydrated before reuse.

In his application Serial No. 462,370, filed October 17, 1942, the present inventor described an alcoholysis process wherein a fatty glyceride is reacted with an alcohol, preferably in the presence of an alcoholysis catalyst, and thereafter unreacted alcohol is removed by distillation in substantially anhydrous condition before the separation of the glycerine and the esters. Since the distillation residue contains substantially no alcohol as a common solvent for the glycerine and the alkyl esters, a relatively sharp separation can be obtained upon settling. One of the disadvantages that this method has in common with prior art methods is that refined oils containing, at most, only small amounts of free fatty acids are required to be used in order to obtain the most satisfactory results. Moreover, as in prior art methods, when employing an alkaline alcoholysis catalyst, at least a portion of the alkaline catalyst reacts with the fatty glycerides and/or esters to form soap. After distilling off the unreacted alcohol, the soap formed gels if the temperature is substantially decreased. Although there is relatively little tendency to gel when carrying out the alcoholysis with methyl alcohol, this tendency increases with an increase in the molecular weight of the alcohol employed. Even when the separation of a glycerine layer is obtainable, it has been the procedure to acidify the withdrawn glycerine layer to form free fatty acids which can be removed or to treat with brine for salting out the soap formed.

It is an object of the present invention to provide an improved process for reacting fatty glycerides with an alcohol in the presence of an alkaline alcoholysis catalyst to produce sharply separable layers of fatty esters and glycerine.

It is also an abject of this invention to provide an improved method for producing alkyl esters and glycerine from fats and fatty oils whereby the esters and glycerine can be rapidly and almost completely separated in a settling operation alone.

It is another object of the invention to provide a new alcoholysis process wherein glycerine is obtained in fluid condition and in an acidic solution.

A further object of the invention is the provision of a novel process for treating unrefined fatty oils with an alcohol to produce commercially satisfactory yields of alkyl esters and glycerine upon an industrial scale.

Other objects and advantages of the invention will be apparent from the following description.

According to the present invention, a fatty glyceride is contacted with an alcohol in the presence of an alkaline alcoholysis catalyst for a relatively short time, and the mixture may be kept at room temperature or may be heated during a few minutes' interval to obtain rapid alcoholysis. The temperature is increased to vaporize unreacted alcohol, but preferably only to a temperature insufficient for substantial reversal of the reaction in the absence of the alcohol. The unreacted alcohol is thus removed in a single distillation and in substantially anhydrous condition. After removal of the alcohol, the residue is acidified, preferably with a mineral acid, and is thereafter allowed to settle. Glycerine separates out as a fluid lower layer substantially free of fatty esters and is withdrawn, and the upper layer containing alkyl esters, and in some cases incompletely reacted glycerides, is also removed for further processing. The upper layer comprising esterified material may be treated in any of several ways, as has been pointed out in application Serial No. 462,370.

In a preferred procedure, the fatty glyceride is passed together with an alcohol and an alkaline catalyst through a contactor coil, and the mixture is run, under reduced pressure if desired, over a bank of steam coils. The coils are heated to a elevated temperature above the temperature of gelatinization of the resulting mixture due to soap formed by saponification of part of the resulting esters by the catalyst but below the temperature of substantial homogeneity of said mixture (i. e., the temperature at which the mixture forms a single phase). The alcohol is volatilized, and the remainder of the mixture is run into a neutralization tank where sufficient mineral acid is introduced to produce an acidic reaction mixture, preferably having a pH of about 2 to about 5. This acidic mixture is run into a settling chamber from which a lower glycerine layer can be withdrawn.

In an alternative procedure, the mixture may be contacted under superatmospheric pressure at an elevated temperature for a short period, say about ten minutes or even less, and then released into a lower pressure zone to flash off the unreacted alcohol. A stream of acid is then brought into confluence with the remainder of the mixture in strength and amount sufficient to acidify the same, and the merged streams are passed through a contactor coil to obtain thorough mixing and acidification. The acidified material then passes to the settling chamber. Although high temperatures may be advantageously employed in the flashing for substantially complete volatilization of the alcohol, the operation is preferably controlled so that the end temperature is below the temperature of substantial reversal of the reaction upon removal of the alcohol and, more preferably, below the temperature of substantial homogeneity of the resulting mixture.

In carrying out the alcoholysis, the temperature may be regulated as desired. In general, however, an early increase in temperature tends to accelerate the saponification of the esters by the alkaline catalyst before completion of the alcoholysis, which may be an undesirable result. For this reason, temperatures of about 60° C. are usually to be avoided at the start of the reaction, and satisfactory results have been obtained when operating at about 40° C. to about 50° C., especially in ethanolysis, although with low temperatures longer times of contact are preferred. In increasing the temperature to volatilize the alcohol, it is advantageous to carry out such volatilization below the temperature of substantial reversal of the reaction upon removal of the alcohol and preferably below the temperature of substantial homogeneity of the resulting mixture. This temperature of homogeneity varies somewhat, depending upon the character of the fatty acid radical involved. In general, with coconut oil and oils having a mixture of glycerides of like molecular weight, temperatures below about 130° C. give satisfactory results, and, with most glycerides, a temperature of about 110° C. to about 123° C. has been found to provide rapid removal of the lower alcohols, especially at reduced pressures, without homogeneity or substantial reversal. In general, the operation may be carried out at reduced pressures, at atmospheric pressure or at superatmospheric pressures.

The glycerine separation may be carried out stepwise. After removal of the lower glycerine layer in the settling chamber, additional alcohol and alcoholysis catalyst can be added to the upper layer containing alkyl esters and unreacted material and the liquid body thus formed again contacted and settled, as noted in application Serial No. 462,370. However, it will be appreciated that some of the advantages of this invention are lost by this procedure, in that sufficient alcoholysis catalyst must be added to provide an excess after neutralization of the acid contained in the upper layer. Moreover, the unreacted alcohol recovered from subsequent volatilizations may contain a proportion of water as a result of the addition of water with the acid in the first acidification, although this proportion may be relatively small.

The fat and/or fatty oils treated may be any of those suitable for employment by the soapmaking art in any of the processes heretofore known, especially those containing glycerides of fatty acids having about eight to about twenty-six, and preferably about twelve to about twenty, carbon atoms per molecule. These include coconut oil, palm oil, olive oil, cottonseed oil, corn oil, tung oil, wool fat, tallow, whale and fish oils, soya bean oil, etc. While it is preferred to use a refined oil containing substantially no moisture, as alcoholysis with an alkaline alcoholysis catalyst has its greatest effectiveness under anhydrous conditions, the presence of free fatty acid to the amount of about 10% to about 20% or even higher is permissible. Sufficient alkaline catalyst is added, however, to provide an excess of alkali above that used up by large amounts of free fatty acid present, and after acidification the fatty acid goes into the ester layer. In this manner the soap formed is split, and emulsification is prevented.

In carrying out the alcoholysis according to this invention, short chain aliphatic alcohols, including aryl-substituted aliphatic alcohols, are preferably employed, particularly the saturated, primary alcohols, especially alcohols having a boiling point in the presence of water in excess of the azeotropic composition of lower than 100° C. at atmospheric pressure and, more particularly, the lower alcohols having one to about six carbon atoms per molecule. Thus, alcohols satisfactory for use in forming esters with the fatty acid components of the glycerides treated include methyl alcohol, ethyl alcohol, propyl alcohol, isopropyl alcohol, n-butyl alcohol, isobutyl alcohol, tertiary butyl alcohol, the amyl alcohols, benzyl alcohol, etc. It is desirable to employ an amount of alcohol from about 50% in excess to about 400% in excess of the calculated theoretical amount necessary for alcoholysis of the particular glycerides treated and to maintain substantially anhydrous conditions during the alcoholysis. Better yields are obtainable by mixing the reactants in the cold, say at about room temperature, and then heating the mixture to the desired temperature, than when preheating is employed.

Among the alkaline alcoholysis catalysts which have been found suitable for use in the present process are sodium hydroxide, sodium carbonate, sodium methylate, lime, etc. While it is possible to obtain good yields with very small amounts of catalysts if sufficient time is allowed for the reaction, proportions of about 0.03 mol to about 0.30 mol of catalyst per equivalent of fatty glycerides are preferably employed.

In selecting an acid for acidification of the reaction mixture after removal of unreacted alcohol, an acid stronger than the fatty acid of the glyceride is used, and it is preferred to employ a mineral acid. Thus, if a higher fatty acid or similarly weak acid is used, the soap formed would not be split, resulting in emulsification and the necessity for salting out the soap. Among the acids which have proved satisfactory are acetic acid, hydrochloric acid, sulphuric acid, phosphoric acid, sulphur dioxide, benzene sulphonic acid, etc. The amount of water introduced with the acid during acidification (that is, the concentration of the acid) is controlled to give a desired concentration of glycerine in the lower layer, and a 50% to 70% solution of glycerine is usually preferred.

The process of the present invention will now be described with respect to certain embodiments. It will be understood that the following examples are merely illustrative and that this invention is not limited thereto.

*Example I*

About 215 parts by weight per minute of dry, refined coconut oil are passed into a contactor coil in confluence with about 130 parts per minute of methanol containing solid sodium hydroxide dissolved therein in the proportion of about 1 part by weight of sodium hydroxide to 64 parts of methanol. The contactor coil is of such dimensions that it contains about 2,500 parts by weight of material. The materials are turbulently mixed in the contactor coil at about room temperature, and the mixture flows from the outlet of said coil into a volatilization chamber, which is under an absolute pressure of about 2 inches of mercury. The reaction mixture, containing methyl esters of the coconut oil fatty acids and glycerine, with unreacted alcohol and some of the glycerides only partially reacted, flows downward over a series of steam coils at a temperature of about 125° C., and the unreacted alcohol is volatilized and removed from the chamber.

The esters and glycerine, substantially free of alcohol, are run into an acidification tank in confluence with a stream of about 1% sulphuric acid in sufficient amount to provide an acidic reaction mixture having a pH of about 4.0. After thorough mixing, the acidified mixture is run into a separation tank and allowed to settle. A glycerine layer, which remains fluid and may be easily handled, is withdrawn at the bottom of the separation tank, and the upper layer containing methyl esters and partially reacted glycerides overflows through an outlet at the top of the tank. The upper layer is substantially free of glycerine, and a portion is used as such without further treatment, while a second portion is subjected to vacuum distillation. The distillate of the second portion comprises the crude methyl esters of the coconut oil acids, and the distillation residue comprising partially reacted glycerides is recovered for further processing.

*Example II*

Corn oil, refined and substantially anhydrous, is run into a contactor coil at the rate of about 295 parts per minute. Ethyl alcohol containing about 0.8% of sodium hydroxide is also run into the coil at the rate of about 140 parts per minute. The contactor coil is of such dimensions that it contains about thirty minutes' run of materials, and the coil is heated for about the outlet half of its length to a temperature of about 45° C. The materials, thoroughly and turbulently mixed therein, are delivered from the coil to the outer surface of steam coils in a volatilization chamber, and unreacted ethyl alcohol is there volatilized and removed.

The hot reaction products are contacted below the steam coils with a stream of sulphur dioxide which is delivered in sufficient amount to split any soap formed from saponification of the corn oil esters with the sodium hydroxide catalyst. The materials are thoroughly mixed in a second contactor coil and are delivered to a settling chamber, where they separate into two layers. The lower glycerine layer is in a fluid condition and is easily pumped from the bottom of the settling chamber. The upper layer overflows through an outlet at the top of the chamber and comprises corn oil fatty acids and their ethyl esters, partially reacted glycerides, and less glycerine than would be obtained under alkaline conditions. The treatment of the upper layer is the same as described with respect to Example I.

As has been pointed out supra, it is an advantageous feature of the present invention that unrefined oils containing as much as 20% or more of free fatty acids may be employed in the present process.

*Example III*

Tallow having about 24% of free fatty acid (determined as oleic acid) is heated to about 70° C. and run into a reaction vessel at the rate of about 282 parts by weight per minute. About 160 parts of methyl alcohol containing about 12 parts of sodium hydroxide to neutralize the free acid and to catalyze the reaction is prepared, and this solution is also heated to about 70° C. and pumped into the reaction vessel at a rate of about 172 parts per minute in confluence with the tallow. The material is thoroughly mixed in the vessel and, after about ten minutes, is run into a contactor coil which passes through a heat exchange unit, whereby the temperature of the reaction mixture is increased to about 135° C. under a pressure of about 75 pounds per square inch. The material is injected into a flash chamber which is under an absolute pressure of about 2 inches of mercury, and the unreacted alcohol is there volatilized and removed.

The reaction product comprising the methyl esters of tallow fatty acids together with glycerine runs into an acidification chamber where it is mixed with about half its volume of 1% sulphuric acid. The acidified reaction mixture is then passed to a settling tank, where it settles into two liquid layers. The layers are separately withdrawn.

The ester fractions obtained according to the present invention with or without washing and/or subsequent purification can be employed in many chemical processes and products, as in the paint, perfumery, lubricating oils, medicinals and other fields. They may be used in many chemical syntheses, and one of their greatest outlets for volume consumption is in the soap-making industry.

Although the present invention has been described with reference to particular embodiments and examples, it will be apparent to those skilled in the art that variations and modifications of this invention can be made and that equivalents can be substituted therefor without departing from the principles and true spirit of the invention.

The present application is a continuation-in-part of United States application Serial No. 462,370, filed October 17, 1942.

I claim:

1. The process which comprises reacting a fatty glyceride with a monohydric alcohol having one to about six carbon atoms per molecule in the presence of an alkaline alcoholysis catalyst to produce a liquid body containing esters of the alcohol with fatty acids, glycerine and unreacted alcohol; volatilizing the unreacted alcohol from said liquid body; acidifying the residue of said liquid body; and separating the esters from the glycerine.

2. The process which comprises reacting a fatty glyceride with a saturated aliphatic alcohol having one to about six carbon atoms per molecule in the presence of an alkaline alcoholysis catalyst to produce a liquid body containing alkyl esters, glycerine, and unreacted alcohol; volatilizing the unreacted alcohol from said liquid body; acidifying the residue of said liquid body; and separating the alkyl esters from the glycerine.

3. The process which comprises reacting a fatty glyceride with a saturated aliphatic alcohol having one to about six carbon atoms per molecule in the presence of an alkaline alcoholysis catalyst to provide a liquid body containing alkyl esters, glycerine and unreacted alcohol; volatilizing the unreacted alcohol from said liquid body; acidifying the residue of said liquid body with an aqueous mineral acid; and separating the alkyl esters from the glycerine.

4. A process for treating fatty glycerides which comprises reacting a fatty glyceride with a saturated, straight-chain, aliphatic alcohol having one to about six carbon atoms per molecule in the presence of an alkaline alcoholysis catalyst to produce a liquid body containing alkyl esters, glycerine and unreacted alcohol; distilling the unreacted alcohol from said liquid body; acidifying the residue of the liquid body with an acid stronger than the fatty acid of the glyceride to provide an upper layer containing alkyl esters and a lower layer containing glycerine; and separating the upper layer from the lower layer.

5. A process for treating fatty glycerides which comprises reacting a fatty glyceride containing free fatty acid with a saturated aliphatic alcohol having one to about six carbon atoms per molecule in the presence of sufficient alkaline agent to neutralize the free fatty acid and to provide an alcoholysis catalyst, whereby a liquid body containing alkyl esters, glycerine and unreacted alcohol is produced; distilling the unreacted alcohol from said liquid body; acidifying the residue of the liquid body with an acid stronger than the fatty acid of the glyceride; and separating an upper layer containing alkyl esters from a lower layer containing glycerine.

6. A process for treating fatty glycerides which comprises reacting a fatty glyceride with methyl alcohol in the presence of an alkaline alcoholysis catalyst to produce a liquid body containing methyl esters, glycerine and unreacted methyl alcohol; distilling the unreacted methyl alcohol from said liquid body; acidifying the residue of said liquid body with an acid stronger than the fatty acid of the glyceride; and separating an upper layer containing methyl esters from a lower layer containing glycerine.

7. A process for treating fatty glycerides which comprises reacting a fatty glyceride and ethyl alcohol in the presence of an alkaline alcoholysis catalyst to produce a liquid body containing ethyl esters, glycerine and unreacted ethyl alcohol; distilling the unreacted ethyl alcohol from said liquid body; acidifying the residue of said liquid body with an acid stronger than the fatty acid of the glyceride; and separating an upper layer containing ethyl esters from a lower layer containing glycerine.

8. A process for treating fatty glycerides which comprises reacting a fatty glyceride with a short chain aliphatic alcohol in the presence of an alkaline alcoholysis catalyst to produce a liquid body containing alkyl esters, glycerine and unreacted alcohol; volatilizing the unreacted alcohol from said liquid body; acidifying the residue of said liquid body with an acid of sufficient strength and in sufficient amount to provide a mixture having a pH of about 2 to about 5; and separating an upper layer containing alkyl esters from a lower layer containing glycerine.

9. A process for the alcoholysis of fatty glycerides which comprises reacting a fatty glyceride with a saturated aliphatic alcohol having one to about six carbon atoms per molecule in the presence of an alkaline alcoholysis catalyst to produce a liquid body containing alkyl esters, glycerine and unreacted alcohol; volatilizing the unreacted alcohol from said liquid body; acidifying the residue of said liquid body with dilute sulphuric acid in sufficient amount to provide a mixture having a pH of about 2 to about 5; and separating the alkyl esters from the glycerine.

10. A process for the alcoholysis of fatty glycerides which comprises reacting a fatty glyceride with a saturated aliphatic alcohol having one to about six carbon atoms per molecule in the presence of an alkaline alcoholysis catalyst to produce a liquid body containing alkyl esters, glycerine and unreacted alcohol; volatilizing the unreacted alcohol from said liquid body; acidifying the residue of said liquid body with sulphur dioxide; and separating the alkyl esters from the glycerine.

11. A process for the alcoholysis of fatty glycerides which comprises reacting a fatty glyceride with methyl alcohol in the presence of an alkaline alcoholysis catalyst at a temperature sufficient to cause rapid alcoholysis, whereby a liquid body containing methyl esters, glycerine and unreacted methyl alcohol is produced; flashing said liquid body into a reduced pressure zone at a temperature sufficient to vaporize methyl alcohol therefrom but to an end temperature below the temperature of substantial reversal of the reaction in the absence of alcohol; acidifying the residue of said liquid body with a mineral acid in sufficient amount to provide a mixture having a pH of about 2 to about 5; and separating an upper layer containing methyl esters from a lower layer containing glycerine.

12. A process for the alcoholysis of fatty glycerides which comprises reacting a fatty glyceride with ethyl alcohol in the presence of an alkaline alcoholysis catalyst at a temperature sufficient to cause rapid alcoholysis, whereby a liquid body containing ethyl esters, glycerine and unreacted ethyl alcohol is produced; flashing said liquid body into a reduced pressure zone at a temperature sufficient to vaporize ethyl alcohol therefrom but to an end temperature below the temperature of substantial reversal of the reaction in the absence of alcohol; acidifying the residue of said liquid body with a mineral acid in sufficient amount to provide a mixture having a pH of about 2 to about 5; and separating an upper layer containing ethyl esters from a lower layer containing glycerine.

WALTER RUSSELL TRENT.